E. MORELLI.
WAGON DUMPING MECHANISM.
APPLICATION FILED JULY 5, 1916.

1,224,487.

Patented May 1, 1917.
3 SHEETS—SHEET 1.

Inventor
Enrico Morelli

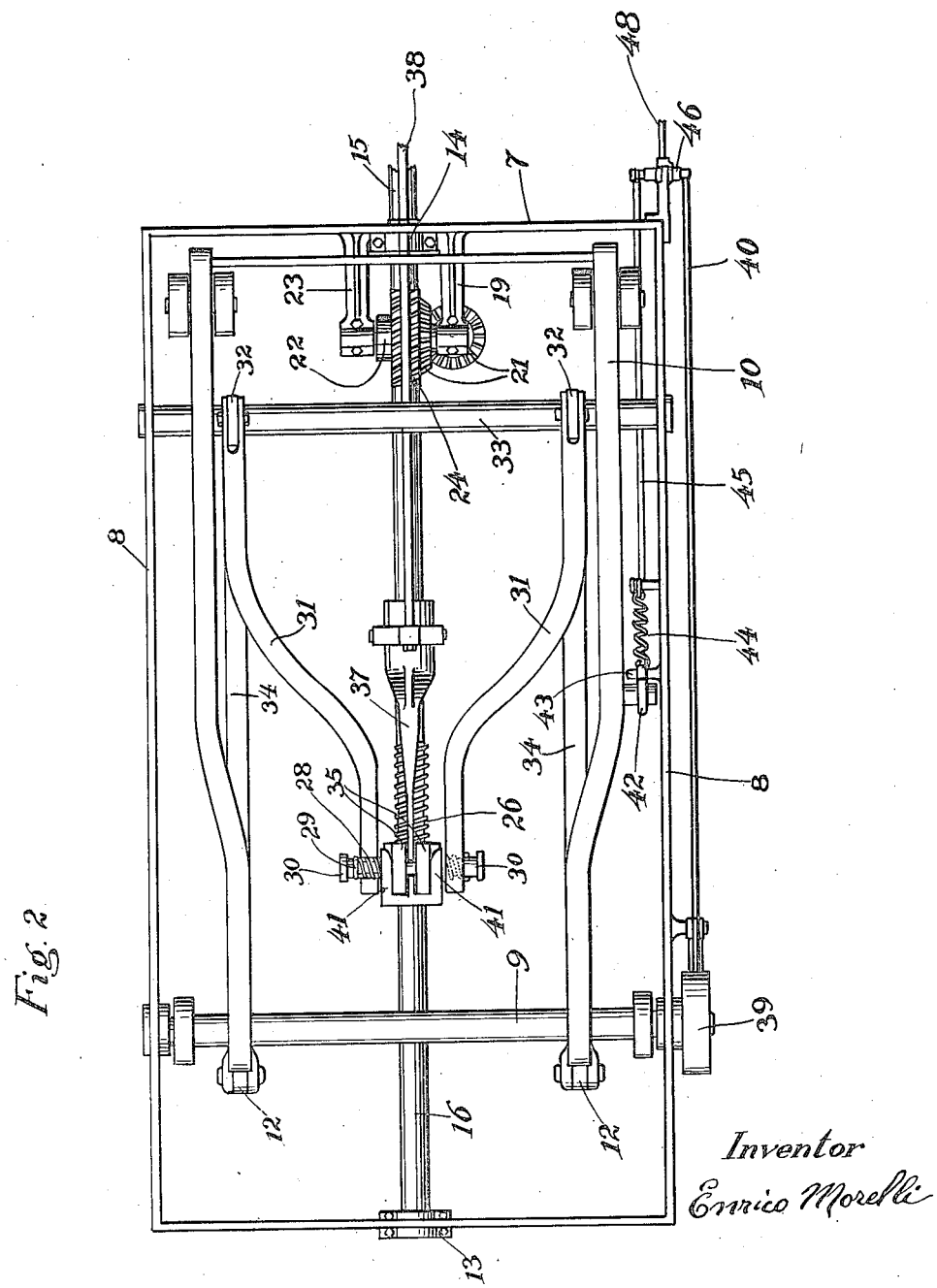

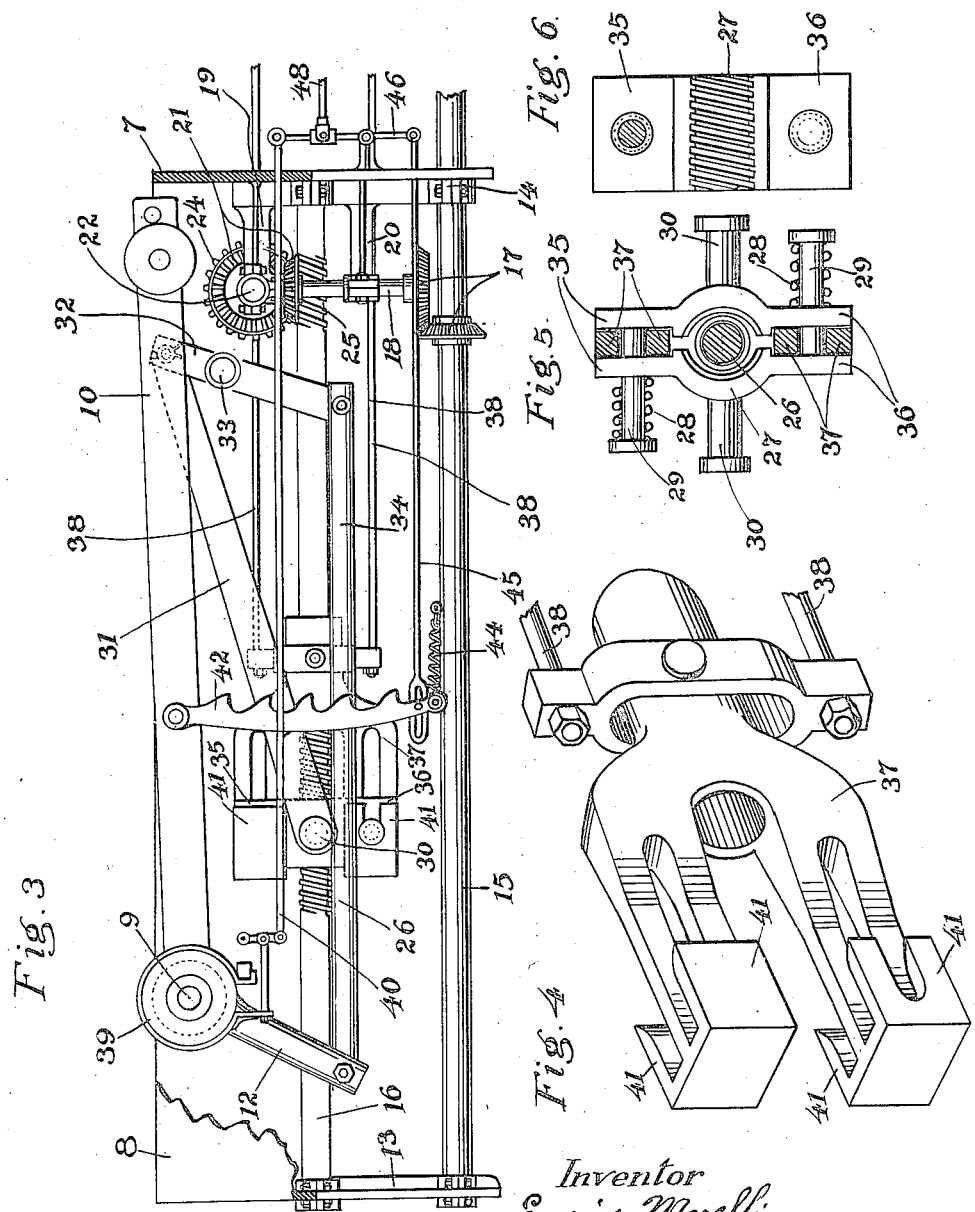

UNITED STATES PATENT OFFICE.

ENRICO MORELLI, OF CINCINNATI, OHIO, ASSIGNOR OF ONE-HALF TO DOMENICO VENOSA, JR., OF CINCINNATI, OHIO.

WAGON-DUMPING MECHANISM.

1,224,487.              Specification of Letters Patent.        Patented May 1, 1917.

Application filed July 5, 1916. Serial No. 107,500.

*To all whom it may concern:*

Be it known that I, ENRICO MORELLI, a subject of the King of Italy, residing in Cincinnati, in the county of Hamilton and State of Ohio, have invented new and useful Improvements in Wagon-Dumping Mechanism, of which the following is a specification.

My invention relates to an improved dumping mechanism for wagons and particularly to a dumping mechanism for automobile trucks.

An object of my invention is to produce a dumping mechanism which may be operated with less expenditure of power than other dumping mechanisms known to me.

A further object is to produce a dumping mechanism in which the frame-carrying body of the vehicle may be quickly raised to its load discharging position and instantly disengaged from the operating mechanism and safely and quickly returned to its normal position.

These and other objects are attained in the improved dumping mechanism described in the following specification and illustrated in the accompanying drawings in which—

Fig. 2 is a plan view of a truck chassis embodying my invention.

Fig. 3 is a side elevation similar to Fig. 1 but showing my improved dumping mechanism more fully, certain portions being shown in section for convenience of illustration.

Fig. 4 is a perspective view of a detail of my invention.

Fig. 5 is a view of a detail of my invention, certain portions being shown in section for convenience of illustration.

Fig. 6 is a view of a detail of my invention.

Figure 1:
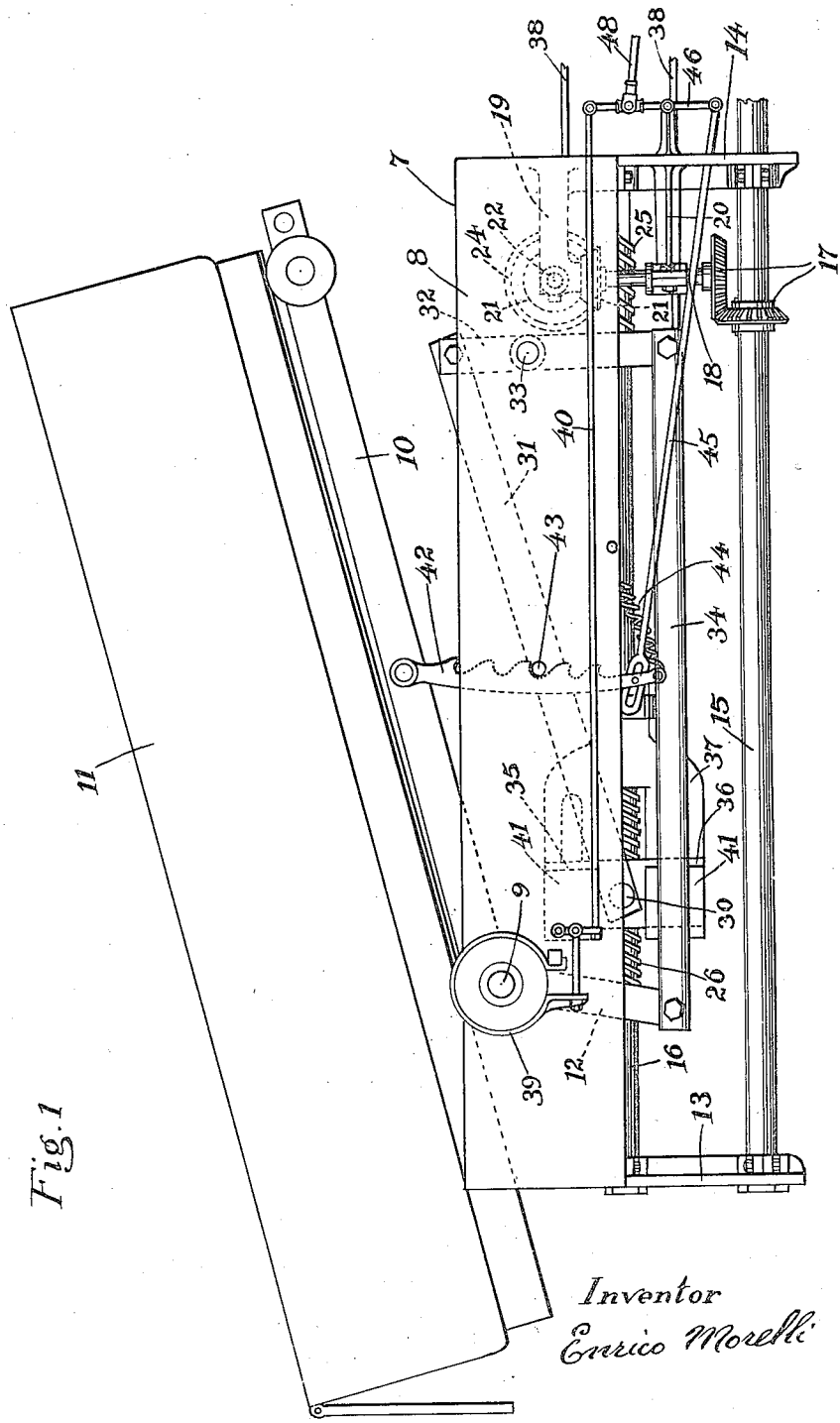
Figure 1 is a side elevation of a truck chassis embodying my invention.

In the illustrated embodiment of my invention I have shown a truck frame or chassis with the running gear and transmission as well as the source of power for operating the truck, removed therefrom, the drawings merely illustrating the portions embodying those features which I claim as my invention. In this illustrated embodiment I provide a chassis 7 which is mounted in any suitable manner upon the running gear of the vehicle. The chassis is provided with side plates 8 in which a shaft 9 which extends transversely of the chassis, is rotatively mounted. This shaft is secured to a frame 10 which constitutes the dumping frame of the vehicle and which carries the usual body 11. It will be seen that the shaft 9 is mounted at the rear of the chassis so that when the frame is raised to the position shown in Fig. 1 the load contained in the body of the truck will be discharged in the usual manner. The dumping frame 10 is provided with depending arms 12 to the ends of which power is communicated in a manner hereinafter to be more fully described for the purpose of raising the dumping frame to the position shown in Fig. 1. In depending bearing brackets 13 and 14 of the chassis 7 I have rotatively mounted two shafts extending from the front to the rear of the chassis. One of these shafts 15 is in any suitable manner connected with the source of power such as the usual internal combustion engine employed for operating the vehicle and the other shaft 16 which is preferably located immediately above the shaft 15 merely extends the length of the chassis. For the purpose of operating shaft 16 from shaft 15 I have provided a series of gears, these gears consisting of a pair of bevel gears 17, one of which is secured to shaft 15 and the other of which is secured to a vertically extending shaft 18 mounted in bearing brackets 19 and 20 secured to the front transverse portion of the chassis. At the upper end of shaft 18 is mounted one of a pair of bevel gears 21, the other of this pair of gears being secured to a shaft 22 rotatively mounted in the bearing 19 and in a bearing 23 located in alinement therewith. Adjacent to the gear 21 secured to shaft 22 is a worm wheel 24 which meshes with a worm 25 located or formed on the shaft 16. Thus rotation of shaft 15 communicates motion to shaft 16. Adjacent to the opposite end of shaft 16 is formed a screw thread 26. This screw thread meshes with the screw threads formed on the interior of a split nut 27, the nut being provided with compression springs 28 mounted on pins 29 secured to the halves of the nut for the purpose of normally holding the internal threads thereof in engagement with the screw threads of shaft 16. This split nut is provided with pins 30 to which are connected the ends of two links 31 which are in turn connected at their opposite ends with the upper end of rocking levers 32 pivotally mounted on a transverse bar 33 mounted in the side plates 8 of chassis. The lower ends of the rocking levers 32 are pivotally connected to longitudinally extending links 34, the forward ends of which are pivotally connected with the lower ends of the arms 12 of the dumping frame. Thus it will be seen that when the shaft 16 is rotated, the screw threads thereof in coöperation with the screw threads of the split nut will cause the links 31 and 34, through their connected levers 32 to lift the dumping frame.

Since the lifting movement of the dumping frame must of necessity be somewhat slow I have provided means for disconnecting the split nut from the screw threads so as to permit of the complete disengagement therefrom in order to allow the dumping frame to be rapidly returned to its normal position as disclosed in Fig. 3. This means consists of a member 37 having a forked appearance, a detail view of which is shown in Fig. 4. This member is so shaped and located that its prongs are located between the upwardly and downwardly extending lugs 35 and 36 of the split nut as disclosed in Figs. 2 and 5. This member 37 is operatively connected by means of rods 38 in the manner shown in Figs. 2 and 3, with any suitable operating mechanism which is preferably located at the driver's end of the truck. When member 37 is moved toward the rear of the truck the wedge shaped prongs will spread the halves of the nut apart and cause complete disengagement thereof from the screw threads 26 of the shaft 16. Having been operatively disconnected from the shaft 16 the dumping frame will return to its normal position but in order to prevent too rapid a return thereof I have provided means consisting of a brake 39 mounted on one side of shaft 9. This brake is operated in any suitable manner by means of a rod 40 extending to the driver's end of the truck. By means of this brake the return of the dumping frame to its normal position is controlled. In addition to providing means for moving the halves of the split nut apart, I have provided means for locking these halves together in engagement with the screw threads 26. This means consists of flanges 41 formed on the ends of the wedge shaped ends of the member 37. These flanges are adapted to engage the outer sides of the lugs 35 and 36 of the halves of the split nut, for the purpose of retaining them in position upon the screw threads 26. This locking means is rendered operative only when the wedge shaped ends of the members 37 are withdrawn from engagement with the nut. In addition to the locking means and the brake, I have provided safety means for positively preventing the dumping frame from falling from its elevated or load discharging position, this means consisting of a notched link 42 depending from one of the dumping frame side members and engaging a pin 43 secured in one of the plates 8 of the chassis 7. This link is retained in its normal pin-engaging position as shown, by means of a spring 44. However I have provided means for disengaging the link 42 from the pin when it is desired to restore the dumping frame to its lowered position, this means being brought into operation simultaneously with the operation of the brake 39. The disengaging means disclosed consists of a link 45 having a lost motion connection at its link-engaging end and a pivotal connection at the lower end of a lever 46 which is pivoted between its ends. The upper end of the lever 46 is pivotally connected with one end of the brake operating rod 40. Intermediate the pivot point of lever 46 and its upper end is connected a rod 48 extending to the operator's position. It will be seen that with this connection, the link 42 will be permitted to automatically lock the dumping frame against accidental return to its normal position, and that upon pulling the brake rod the brake is tightened and the safety link is simultaneously disengaged, the rod 45 pushing the link from engagement with the pin 43.

Having thus described my invention what I claim is:—

1. In a wagon dumping mechanism the combination of a chassis, a body-carrying frame pivotally mounted on the chassis and adapted to be lifted to bring the body mounted thereon from its normal load-carrying position to an elevated load-discharge position, a screw threaded driving shaft, a split internally screw threaded nut mounted on the shaft, means operatively connecting the frame and the nut, and mechanism for clamping the nut in operative relation with the shaft when moved in one direction and for disconnecting the nut from the shaft when moved in the opposite direction, to permit the frame to return to its normal position after movement thereof to its load-discharging position.

2. In a wagon dumping mechanism the combination of a chassis, a body-carrying frame pivotally mounted on the chassis and adapted to be lifted to bring the body mounted thereon from its normal load-carrying position to an elevated load-discharging position, a screw threaded driving shaft, a split internally screw threaded nut mounted on the shaft, means operatively connecting the frame and the nut, mechanism for clamping the nut in operative relation with the shaft when moved in one direction and for operatively disconnecting the nut from the shaft when moved in the opposite direction, to permit the frame to return to its normal position after movement thereof to its load-discharging position, a ratchet link adapted to permit elevation of the body-carrying frame to a load-discharging position and to prevent return thereof to its normal position, a brake adapted to permit elevation of the body-carrying frame to a load-discharging position, and means adapted simultaneously to release the link and to operate the brake to restrain return of said body-carrying chassis to its load-carrying position.

3. In a wagon dumping mechanism the combination of a chassis, a body-carrying frame pivotally mounted on the chassis and adapted to be lifted to bring the body mounted thereon from its normal load-carrying position to an elevated load-discharging position, a screw threaded driving shaft, a split internally screw threaded nut mounted on the shaft, a series of links operatively connecting the frame and the nut, and mechanism for clamping the nut in operative relation with the shaft when moved in one direction and for operatively disconnecting the nut from the shaft when moved in the opposite direction, to permit the frame to return to its normal position after movement thereof to its load-discharging position.

In testimony whereof, I affix my signature in the presence of two witnesses.

ENRICO MORELLI.

Witnesses:
 FILIPPO RACCIO,
 CHAS. BUSCHMAN.